D. D. MURRELL.
MEASURING SCOOP.
APPLICATION FILED AUG. 17, 1915.

1,188,980.

Patented June 27, 1916.

WITNESSES:
John H. Phillips
R. W. Smith

INVENTOR
DAVID D. MURRELL,
BY Munn & Co
ATTORNEYS

UNITED STATES PATENT OFFICE.

DAVID DIXON MURRELL, OF TAMPA, FLORIDA.

MEASURING-SCOOP.

1,188,980. Specification of Letters Patent. Patented June 27, 1916.

Application filed August 17, 1915. Serial No. 45,880.

*To all whom it may concern:*

Be it known that I, DAVID D. MURRELL, a citizen of the United States, and a resident of Tampa, in the county of Hillsborough and State of Florida, have invented a certain new and useful Improvement in Measuring-Scoops, of which the following is a specification.

One of the principal objects of my invention is to provide a scoop especially adapted for grocers' use, having an adjustable partition or disk arranged in the scoop whereby the volume of the scoop may be varied in order that various predetermined quantities of material may be accurately measured.

A further object of the invention is to provide a scale on the scoop handle by which the partition or disk may be accurately adjusted so that the scoop will hold the required amount, the scale being adjustable relatively to the scoop handle whereby different varieties of commodities may be accurately measured.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawing in which like characters of reference indicate like parts throughout the several figures, of which—

Figure 1:
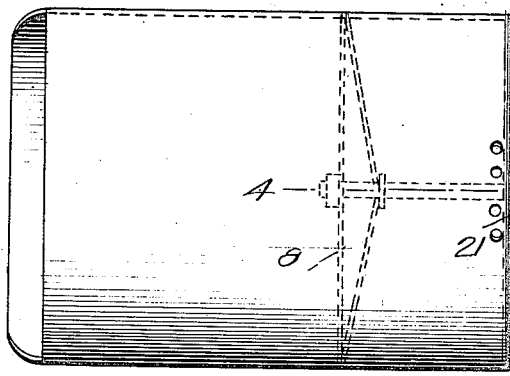
Figure 2:
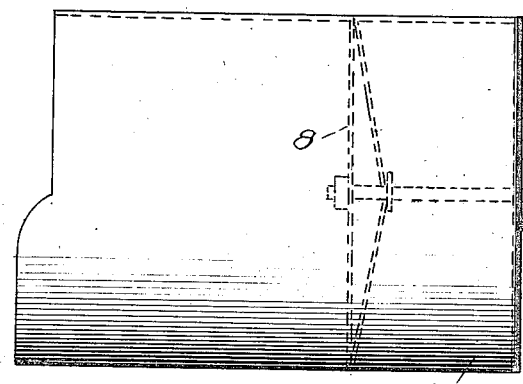
Figure 3:
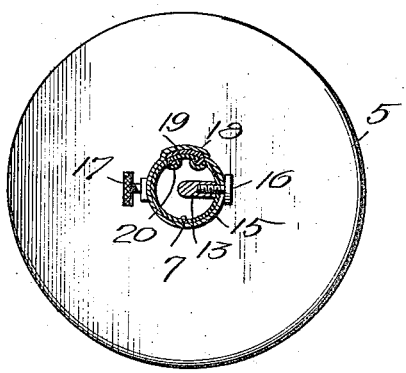
Figure 4:
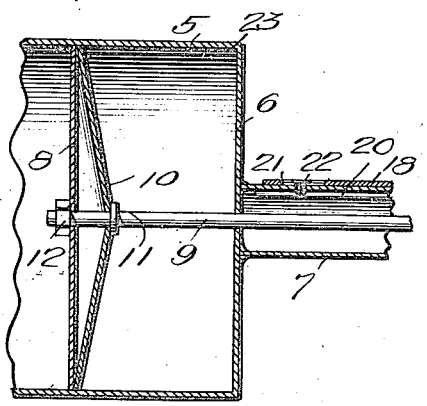

Figure 1 represents a top plan view of a scoop constructed according to my invention. Fig. 2 represents a side elevational view thereof. Fig. 3 represents a view in section taken vertically and transversely on the plane indicated by the line 3—3 of Fig. 2. Fig. 4 represents a view in section taken longitudinally and vertically on the plane indicated by the line 4—4 of Fig. 1.

In carrying out my invention I provide a scoop whose body 5 is of a cylindrical formation and is closed at its inner end as at 6. A hollow cylindrical handle 7 is connected with the closure 6 and extends axially of the scoop. Arranged for adjustment within the scoop body 5 is a partition or disk 8, which is carried by a rod 9 extending through closure 6 and into the handle 7 axially thereof. A brace 10 in the nature of a concavo-convex disk is carried by rod 9 in advance of an annular shoulder 11 and engages against the disk 8 adjacent the periphery of the latter. A nut 12 threaded onto rod 9 in advance of the disk 8 maintains the latter in position on said rod.

The opposite end of the rod within the handle 7 is bent at right angles as at 13 and is disposed in alinement with a longitudinal slot 14 provided in the side of handle 7. A collar 15 surrounds the handle 7 and is slidably disposed thereupon, and this collar carries a set screw 16 which is threaded into the outwardly bent rod end 13 as indicated in Fig. 3. A set screw 17 carried on collar 15 at a diametrically opposed point with respect to screw 16, serves as means whereby the collar may be tightened upon handle 7. Upon loosening set screw 17, the collar may be grasped and shifted longitudinally of the handle in order to adjust the disk or partition 8 longitudinally with respect to the body portion 5 of the scoop.

Arranged upon the upper face of handle 7 is a graduated or scaled bar 18. The longitudinal edges of this bar, which is in fact in the nature of a plate, are turned downwardly to extend through slots 19 provided in the walls of the handle 7, in such manner that the bar is retained against displacement from the handle, but at the same time may be shifted longitudinally with respect to said handle. Closure strips 20 provided on the inside of handle 7 overlie or bridge the slots 19 to prevent entrance of foreign material into the handle. The bar 18 is thus maintained snugly against handle 7 throughout its entire length, so as not to interfere with the adjustments of collar 15, which collar extends over the bar in the manner indicated in Fig. 3.

The graduated bar or scale 18 adjacent its front and rear ends is longitudinally slotted as at 21 and through these slots extend set screws 22. The latter are threaded into openings provided in the upper wall of handle 7, and these set screws serve as means for maintaining the bar 18 in adjusted position relatively to the handle. One of the walls of body 5 adjacent the closure 6 is provided with a plurality of openings 23 to admit free passage of air into and out of the scoop 5 behind the partition or disk 8, in order that the movements of the disk will not be hampered by the compression or exhaustion of air within the scoop.

By adjusting the disk or partition 8 relatively to the scoop body 5, various predetermined weights of dry commodities, such as rice, teas, beans, sugar, corn meal, etc., may be accurately dispensed. By adjusting the scale 18 relatively to the handle, the correct predetermined point at which the device should be set for measuring different varieties of dry commodities may be determined.

Although I have described the preferred embodiment of my invention, I may desire to make such changes in the construction, combination, and arrangement of parts thereof as do not depart from the spirit of the invention and the scope of the appended claims.

I claim:

1. A scoop comprising a cylindrical body portion having its rear end closed and provided with a plurality of openings adjacent its rear end, a disk arranged for reciprocation within the scoop, a hollow cylindrical handle carried by the scoop, a rod connected with the disk and extending into the handle axially of the latter and having an outturned end arranged in alinement with a longitudinal slot provided in the handle, a set screw extending through the slot and being turned into engagement with the outturned rod end, a sleeve surrounding the handle and adapted to be adjusted relatively thereto, through which said sleeve said set screw extends, a second set screw carried by the sleeve and adapted to be turned into engagement with the handle for maintaining the said sleeve in adjusted position relatively to the handle, and a scale carried by the handle and adjustable longitudinally with respect thereto, said sleeve extending across the scale whereby to coact therewith in disposing the disk at a predetermined point within the scoop.

2. A device of the class described including a scoop having a partition arranged for reciprocation therein, and having a hollow handle provided with a longitudinally extending slot, a rod connected with the partition extending into the handle, a scale carried by the handle, a collar mounted on the handle and slidable over the scale, means connecting the collar and rod through the slot in the handle, and means for maintaining the collar in adjusted position relatively to the scale at will.

3. A scoop including a body having a partition slidably arranged therein, a rod connected with the partition, a handle into which the rod extends, a collar connected with the rod and slidably surrounding the handle and adapted to be adjusted relatively to the latter, and a scale, said scale being provided with downturned longitudinal edges extending into slots provided longitudinally of the handle, set screws carried by the handle and extending through slots provided in the scale and adapted to be adjusted for maintaining the scale in a predetermined position relatively to the handle, said collar bridging the scale and adapted to coact therewith in arranging the partition at a predetermined position within the scoop.

DAVID DIXON MURRELL.